US012397933B2

(12) United States Patent
Mukae

(10) Patent No.: US 12,397,933 B2
(45) Date of Patent: Aug. 26, 2025

(54) METHOD, PROCESSING CIRCUITRY, AND COMPUTER READABLE MEDIUM INTENDED FOR USE WITH A SATELLITE CONSTELLATION INCLUDING ONE HUNDRED OR MORE SATELLITES

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/562,339

(22) PCT Filed: Jun. 13, 2022

(86) PCT No.: PCT/JP2022/023591
§ 371 (c)(1),
(2) Date: Nov. 20, 2023

(87) PCT Pub. No.: WO2022/270337
PCT Pub. Date: Dec. 29, 2022

(65) Prior Publication Data
US 2024/0239518 A1     Jul. 18, 2024

(30) Foreign Application Priority Data
Jun. 23, 2021    (JP) ................ 2021-103841

(51) Int. Cl.
*B64G 1/10*     (2006.01)
(52) U.S. Cl.
CPC ......... *B64G 1/1007* (2013.01); *B64G 1/1085* (2013.01)

(58) Field of Classification Search
CPC ............................ B64G 1/1007; B64G 1/1085
See application file for complete search history.

(56) References Cited

U.S. PATENT DOCUMENTS 3,995,801 A * 12/1976 Bond ................. H04B 7/18519
244/158.4
5,813,634 A * 9/1998 Pizzicaroli ......... H04B 7/18519
455/12.1

(Continued)

FOREIGN PATENT DOCUMENTS

EP     3 330 187 A1    6/2018
EP     3 805 110 A1    4/2021

(Continued)

OTHER PUBLICATIONS

Extended European Search Report issued Sep. 23, 2024 in European Patent Application No. 22828254.7, 11 pages.

(Continued)

*Primary Examiner* — Nicholas McFall
(74) *Attorney, Agent, or Firm* — XSENSUS LLP

(57) ABSTRACT

A reserve satellite cluster including a plurality of satellites stands by at an orbit altitude lower than an orbit altitude of a steadily operated satellite cluster in a satellite constellation. In a case where a satellite configuring the steadily operated satellite cluster has been lost, a satellite, existing around a lost orbital position that is an orbital position where a satellite has been lost in the steadily operated satellite cluster, among satellites configuring the reserve satellite cluster is injected into the lost orbital position in an orbit.

12 Claims, 14 Drawing Sheets

(56) References Cited

U.S. PATENT DOCUMENTS

| | | | |
|---|---|---|---|
| 6,267,329 B1 | 7/2001 | Chethik | |
| 6,491,257 B1 * | 12/2002 | Emmons, Jr. | B64G 1/1085 |
| | | | 244/158.6 |
| 7,832,687 B1 * | 11/2010 | Das | B64G 1/002 |
| | | | 244/158.5 |
| 2016/0094288 A1 | 3/2016 | Krebs | |
| 2017/0005719 A1 | 1/2017 | Krebs | |
| 2018/0155065 A1 | 6/2018 | Silva et al. | |
| 2018/0297721 A1 | 10/2018 | Silva et al. | |

FOREIGN PATENT DOCUMENTS

| | | |
|---|---|---|
| JP | 2002-308198 A | 10/2002 |
| JP | 2021-054167 A | 4/2021 |
| JP | 2021-070342 A | 5/2021 |
| WO | 2016/053389 A1 | 4/2016 |
| WO | 2021/060492 A1 | 4/2021 |

OTHER PUBLICATIONS

International Search Report and Written Opinion mailed on Aug. 30, 2022, received for PCT Application PCT/JP2022/023591, filed on Jun. 13, 2022, 9 pages including English Translation.
Notice of Reason for Refusal mailed on Dec. 13, 2022, received for JP Application 2022-568959, 5 pages including English Translation.

* cited by examiner (a) EXAMPLE OF EVEN 24 ORBIT PLANES (b) EXAMPLE IN WHICH PHASES ARE MADE TO DEVIATE SO AS TO BE UNEVEN (c) ADD NOVEL ORBIT PLANE IN VACANT ORBIT

METHOD, PROCESSING CIRCUITRY, AND COMPUTER READABLE MEDIUM INTENDED FOR USE WITH A SATELLITE CONSTELLATION INCLUDING ONE HUNDRED OR MORE SATELLITES

CROSS-REFERENCE TO RELATED APPLICATIONS

This application is based on PCT filing PCT/JP2022/023591, filed Jun. 13, 2022, which claims priority to Japanese Patent Application No. 2021-103841, filed Jun. 23, 2021, the entire contents of each are incorporated herein by reference.

TECHNICAL FIELD

The present disclosure relates to a satellite constellation maintenance method, a satellite constellation, a rocket launching method, a ground installation, a command transmission method, and a command transmission program.

BACKGROUND ART

For a megaconstellation satellite cluster, a satellite cluster to fly on the same orbit plane in an initial preparation phase can be launched in a lump. Accordingly, the number of times of rocket launching can be reduced and costs in the initial preparation phase can be lowered. Patent Literature 1 discloses a megaconstellation. Tens of satellites fly per orbit plane in a megaconstellation satellite cluster and the megaconstellation satellite cluster is formed of tens of orbit planes. Herein, a satellite cluster to fly on the same orbit plane is collectively launched in ordinary launching in a lump because large quantities of propellant and time are required in order for an artificial satellite to greatly change a normal vector direction of an orbit plane on an orbit.

In Starlink (registered trademark) of Space-X, as a specific example, sixty satellites are simultaneously launched with use of a large rocket and about forty launches result in initial preparation of 2400 satellites in total on forty orbit planes. In this operation, sixty follow-on satellites may be launched in a lump after the initial preparation, so that one or two satellites may be placed on each of the forty orbit planes or so that one satellite may be placed on each of sixty orbit planes.

CITATION LIST

Patent Literature

Patent Literature 1: JP 2021-054167 A1

SUMMARY OF INVENTION

Technical Problem

In a case where a follow-on satellite is launched following a failure in a satellite among a megaconstellation satellite cluster, it is necessary to launch only the follow-on satellite onto a lost orbit plane. Further, orbit injection of a follow-on satellite is needed for a satellite having undergone PMD (Post-Mission Disposal) and having deorbited after fulfillment of a designed life, whereas there is a variation in actual on-orbit lives of satellites launched simultaneously.

Therefore, in order to maintain a satellite constellation that is a megaconstellation, it is necessary to inject follow-on satellites into orbits in order in which satellites on a plurality of orbit planes have undergone PMD. Herein, a loss of a satellite resulting from a satellite failure, life fulfillment, or the like after the initial satellite cluster preparation occurs on a random orbit plane and occurs at a random position in the orbit plane. Accordingly, a problem is caused in that satellites launched by a launch of the large number of satellites in a lump cannot be directly injected as the follow-on satellites into orbits.

It is an object of the present disclosure to provide a satellite constellation maintenance method in which follow-on satellites are injected into orbits in response to satellite failures, life fulfillment, or the like after initial satellite cluster preparation in a satellite constellation including one hundred or more satellites and in which the follow-on satellites to replace lost satellites occurring at random orbit positions in random orbit planes are injected into the orbits at low cost by a launch of a large number of satellites in a lump.

Solution to Problem

A satellite constellation maintenance method according to the present disclosure is intended for a satellite constellation including one hundred or more satellites, wherein
  a reserve satellite cluster including a plurality of satellites stands by at an orbit altitude lower than an orbit altitude of a steadily operated satellite cluster in the satellite constellation, and
  in a case where a satellite configuring the steadily operated satellite cluster has been lost, a satellite, existing around a lost orbital position that is an orbital position where a satellite has been lost in the steadily operated satellite cluster, among satellites configuring the reserve satellite cluster is injected into the lost orbital position in an orbit.

Advantageous Effects of Invention

According to the present disclosure, the reserve satellite cluster including the plurality of satellites stands by at the orbit altitude lower than the orbit altitude of the steadily operated satellite cluster in the satellite constellation including one hundred or more satellites and the satellites configuring the reserve satellite cluster each may become a follow-on satellite. Therefore, according to the present disclosure, the satellite constellation maintenance method can be provided in which follow-on satellites are injected into orbits in response to satellite failures, life fulfillment, or the like after initial satellite cluster preparation in the satellite constellation including one hundred or more satellites and in which the follow-on satellites to replace lost satellites occurring at random orbit positions in random orbit planes are injected into the orbits at low cost by a launch of a large number of satellites in a lump.

DESCRIPTION OF EMBODIMENTS

Figure 1:
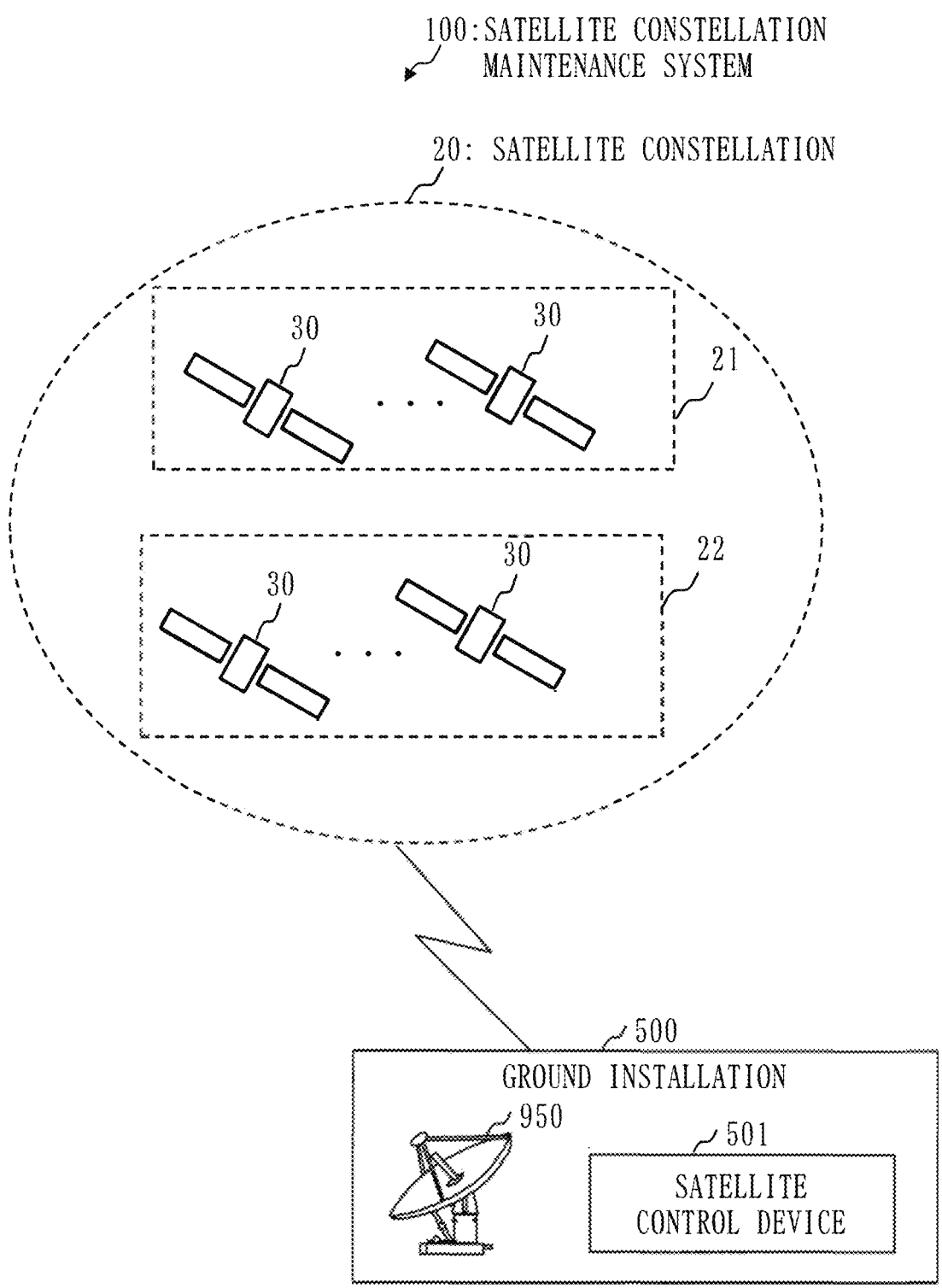
FIG. 1 is a diagram illustrating an outline of a satellite constellation maintenance system 100 according to Embodiment 1.

Hereinbelow, an embodiment of the present disclosure will be described with use of the drawings. Incidentally, in the drawings, identical portions or corresponding portions are provided with identical reference characters. In description on the embodiment, description on the identical portions or the corresponding portions is omitted or simplified appropriately. Further, relation among sizes of configurations in the following drawings may be different from actual relation. Arrows in the drawings principally indicate flow of data or flow of processing. Further, in the description on the embodiment, directions or positions such as "upper", "lower", "left", "right", "fore", "rear", "front", or "back" may be designated. Those expressions are given only for convenience of description and do not restrict placement and orientations of configurations such as devices, instruments, or components.

Further, "unit" may be appropriately read as "circuit", "step", "procedure", "process", "means", or "circuitry".

Embodiment 1

Hereinbelow, the present embodiment will be described in detail with reference to the drawings.
*Description of Configuration*

FIG. 1 illustrates an outline of a satellite constellation maintenance system 100 according to the present embodiment.

As illustrated in the drawing, the satellite constellation maintenance system 100 includes a satellite constellation 20 and a ground installation 500. Herein, an artificial satellite may be expressed simply as a satellite.

The satellite constellation 20 is a satellite megaconstellation typically including one hundred or more satellites 30. Specific examples of the satellite constellation 20 are disclosed in [Reference Literature 1] and [Reference Literature 2]. A specific example of a megaconstellation is disclosed in [Reference Literature 3]. The satellite constellation maintenance system 100 appropriately has functions disclosed in these reference literatures.

The satellite constellation 20 includes a steadily operated satellite cluster 21 and a reserve satellite cluster 22. The steadily operated satellite cluster 21 and the reserve satellite cluster 22 each include a plurality of satellites 30. The satellites 30 included in the steadily operated satellite cluster 21 each provide communication service or the like for users existing on ground, as a specific example. The satellites 30 configuring the reserve satellite cluster 22 each stand by at an orbit altitude lower than an orbit altitude of the steadily operated satellite cluster 21. The satellites 30 configuring the reserve satellite cluster 22 may be each referred to as a reserve satellite.

[Reference Literature 1]
JP 2021-054167 A1
[Reference Literature 2]
JP 2021-070342 A1
[Reference Literature 3]
WO 2021/060492 pamphlet The ground installation 500 includes a communication device 950 and a satellite control device 501 and controls the satellite constellation 20 by communicating with the satellites 30.

The satellite control device 501 is a computer to generate various commands for controlling the satellites 30 and includes hardware such as a processing circuit and an input-output interface. The processing circuit generates the various commands. Input devices and output devices are connected to the input-output interface. The satellite control device 501 is connected to the communication device 950 through the input-output interface.

The communication device 950 communicates with the satellites 30. Specifically, the communication device 950 transmits the various commands to the respective satellites 30.

Figure 2:
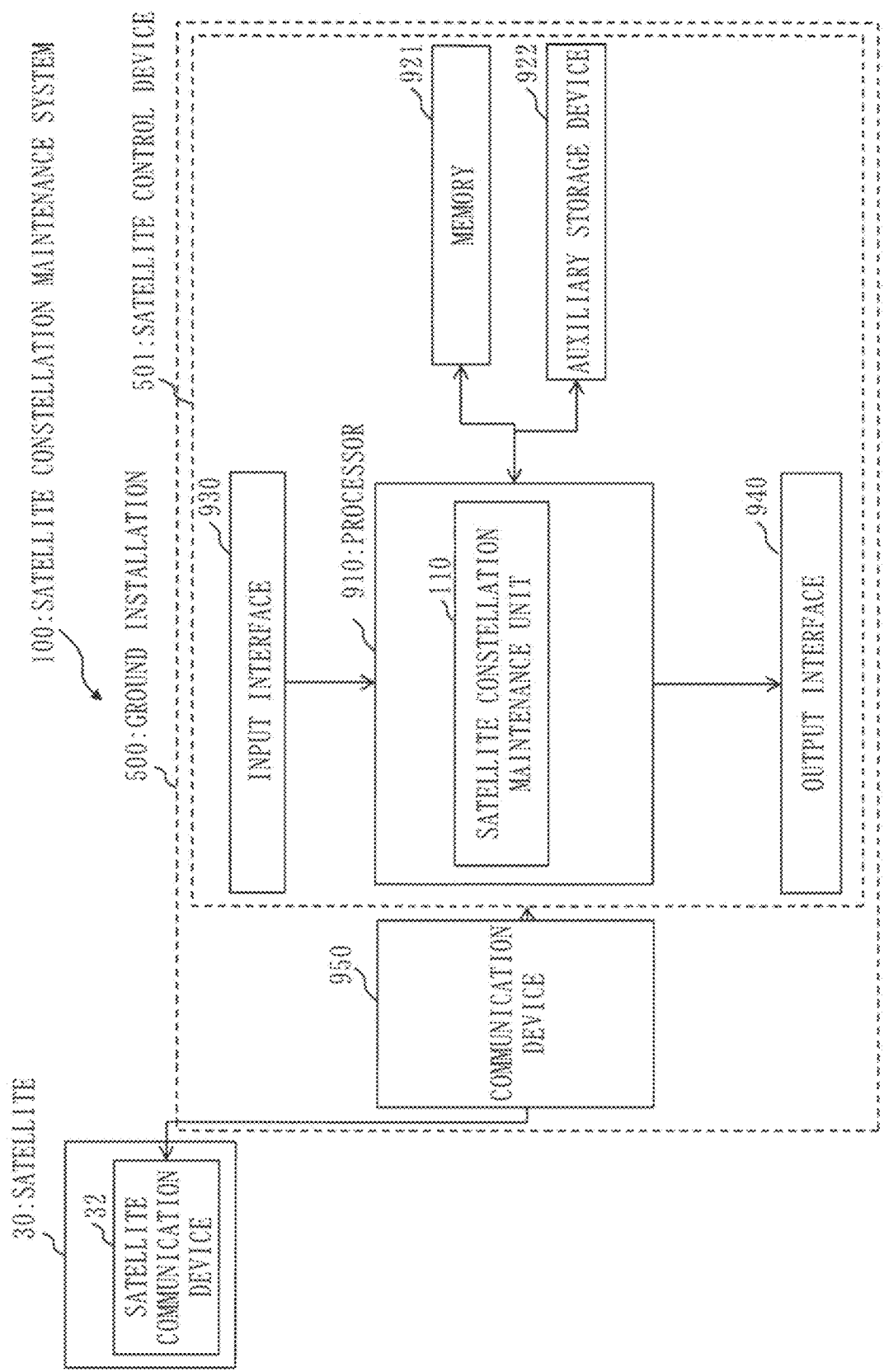
FIG. 2 is a diagram illustrating a configuration example of the satellite constellation maintenance system 100 according to Embodiment 1.

FIG. 2 illustrates a configuration example of the satellite constellation maintenance system 100 according to the present embodiment.

The satellite constellation maintenance system 100 includes a computer. Though FIG. 2 illustrates a configuration having one computer, the satellites 30 of the plurality of satellites that configure the satellite constellation 20 and the ground installation 500 to communicate with the satellites 30 are each provided with a computer, actually. Therein, the computers included in the satellites 30 of the plurality of satellites and in the ground installation 500 to communicate with the satellites 30 cooperate to fulfill functions of the satellite constellation maintenance system 100 according to the present embodiment. Hereinbelow, an example of a configuration of the computers to fulfill the functions of the satellite constellation maintenance system 100 will be described.

The satellite constellation maintenance system 100 includes the satellites 30 and the ground installation 500. The satellites 30 each include a satellite communication device 32 to communicate with the communication device 950 of the ground installation 500.

The satellite constellation maintenance system 100 includes a processor 910 and further includes other hardware such as a memory 921, an auxiliary storage device 922, an input interface 930, an output interface 940, and the communication device 950. The processor 910 is connected to other hardware through signal lines in order to control other hardware.

The satellite constellation maintenance system 100 includes a satellite constellation maintenance unit 110 as a functional element. Functions of the satellite constellation maintenance unit 110 are fulfilled by hardware or software.

The satellite constellation maintenance unit 110 has a function of executing processing for maintaining the satellite constellation 20.

The processor 910 is a device to execute a satellite constellation maintenance program. The satellite constellation maintenance program is a program to fulfill the functions of the satellite constellation maintenance unit 110.

The processor 910 is an IC (Integrated Circuit) to carry out arithmetic processing. Specific examples of the processor 910 are a CPU, a DSP (Digital Signal Processor), and a GPU (Graphics Processing Unit).

The memory 921 is a storage device to temporarily store data. A specific example of the memory 921 is an SRAM (Static Random Access Memory) or a DRAM (Dynamic Random Access Memory).

The auxiliary storage device 922 is a storage device to archive data. A specific example of the auxiliary storage device 922 is an HDD (Hard Disk Drive). Further, the auxiliary storage device 922 may be a portable storage medium such as SD (registered trademark) (Secure Digital) memory card, CF (CompactFlash (registered trademark)), NAND flash, flexible disk, optical disk, compact disc, Blu-ray (registered trademark) disc, or DVD (Digital Versatile Disk).

The input interface 930 is a port to be connected to an input device such as a mouse, a keyboard, or a touch panel. Specifically, the input interface 930 is a USB (Universal Serial Bus) terminal. Incidentally, the input interface 930 may be a port to be connected to a LAN (Local Area Network).

The output interface 940 is a port to which a cable of output equipment such as a display is connected. Specifically, the output interface 940 is a USB terminal or an HDMI (registered trademark) (High Definition Multimedia Interface) terminal. Specifically, the display is an LCD (Liquid Crystal Display).

The communication device 950 includes a receiver and a transmitter. Specifically, the communication device 950 is a communication chip or an NIC (Network Interface Card). The satellite constellation maintenance system 100 carries out communication between the ground installation 500 and the satellites 30 through the communication device 950.

The satellite constellation maintenance program is read into the processor 910 and is executed by the processor 910. In the memory 921, not only the satellite constellation maintenance program but an OS (Operating System) is stored. The processor 910 executes the satellite constellation maintenance program while executing the OS. The satellite constellation maintenance program and the OS may be stored in the auxiliary storage device. The satellite constellation maintenance program and the OS that are stored in the auxiliary storage device are loaded into the memory 921 and are executed by the processor 910. Incidentally, a portion or all of the satellite constellation maintenance program may be integrated into the OS.

The satellite constellation maintenance system 100 may include a plurality of processors that substitute for the processor 910. The plurality of processors share execution of the satellite constellation maintenance program. Each of the processors is a device to execute the satellite constellation maintenance program, as with the processor 910.

Data, information, signal values, and variable values that are utilized, processed, or outputted by the satellite constellation maintenance program are stored in the memory 921, the auxiliary storage device 922, or a register or a cache memory in the processor 910.

The satellite constellation maintenance program causes the computer to execute each process, each procedure, or each step for which "unit" of the satellite constellation maintenance unit 110 is read as "process", "procedure", or "step". Further, a satellite constellation maintenance method is a method that is carried out by execution of the satellite constellation maintenance program by the satellite constellation maintenance system 100.

Any of programs described herein may be stored in a recording medium or a storage medium that is computer-readable and may be further provided. Further, any of the programs described herein may be provided as a program product.

Figure 3:
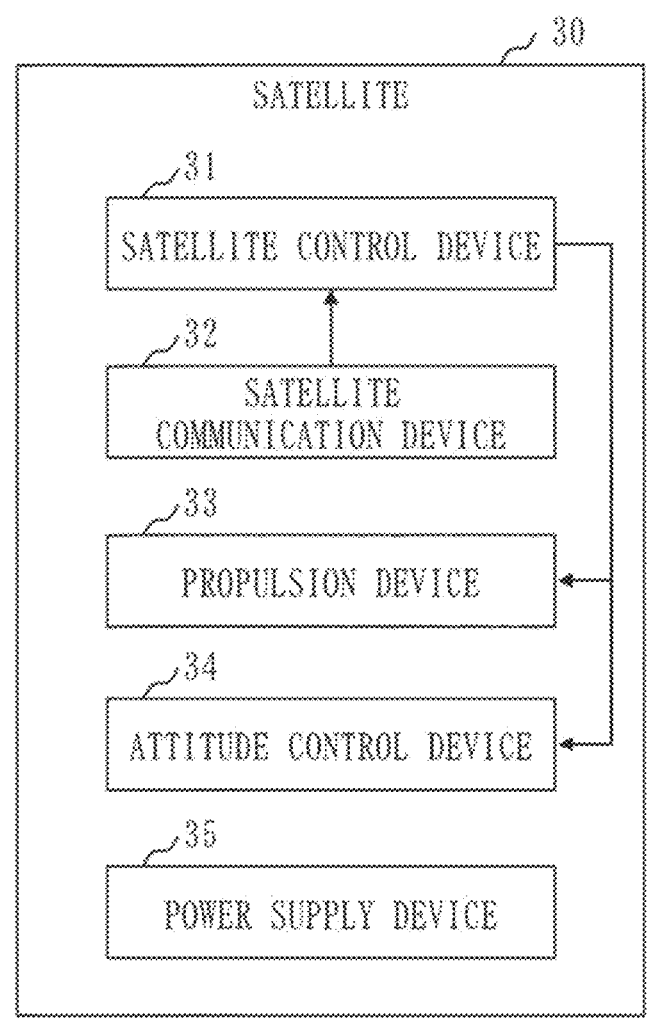
FIG. 3 is a diagram illustrating a configuration example of a satellite 30 according to Embodiment 1.

FIG. 3 illustrates a configuration example of the satellite 30 according to the present embodiment.

The satellite 30 includes a satellite control device 31, the satellite communication device 32, a propulsion device 33, an attitude control device 34, and a power supply device 35. The satellite 30 includes other components to fulfill various functions, whereas the satellite control device 31, the satellite communication device 32, the propulsion device 33, the attitude control device 34, and the power supply device 35 will be described in regard to FIG. 3.

The satellite control device 31 is a computer to control the propulsion device 33 and the attitude control device 34 and includes a processing circuit. Specifically, the satellite control device 31 controls the propulsion device 33 and the attitude control device 34 in accordance with various commands transmitted from the ground installation 500.

The satellite communication device 32 is a device to communicate with the ground installation 500. Specifically, the satellite communication device 32 transmits various types of data on the satellite to which itself belongs, to the ground installation 500. Additionally, the satellite communication device 32 receives the various commands transmitted from the ground installation 500.

The propulsion device 33 is a device to give a propulsive force to the satellite 30 and changes a speed of the satellite 30. Specifically, the propulsion device 33 is an electric propulsion machine. Specifically, the propulsion device 33 is an ion engine or a Hall thruster.

The attitude control device 34 is a device to control attitude elements such as an attitude of the satellite 30, an angular speed of the satellite 30, and a line of sight. The attitude control device 34 changes the attitude elements in desired directions. Alternatively, the attitude control device 34 maintains the attitude elements in desired directions. The attitude control device 34 includes an attitude sensor, an actuator, and a controller. The attitude sensor is such a device as a gyroscope, an earth sensor, a sun sensor, a star tracker, a thruster, and a magnetic sensor. The actuator is such a device as an attitude control thruster, a momentum wheel, a reaction wheel, and a control moment gyro. The controller controls the actuator in accordance with measured data from the attitude sensor or various commands from the ground installation 500.

The power supply device 35 includes equipment such as a solar cell, a battery, and a power controller and supplies power to each equipment mounted in the satellite 30.

The processing circuit included in the satellite control device 31 will be described.

The processing circuit may be dedicated hardware or may be a processor to execute a program stored in a memory.

In the processing circuit, some functions may be fulfilled by dedicated hardware and the remaining functions may be fulfilled by software or firmware. That is, the processing circuit may be implemented by hardware, software, firmware, or a combination of those.

Specifically, the dedicated hardware is a single circuit, a composite circuit, a programmed processor, a parallelly programmed processor, an ASIC (Application Specific Integrated Circuit), an FPGA (Field Programmable Gate Array), or a combination of those.

Figure 4:
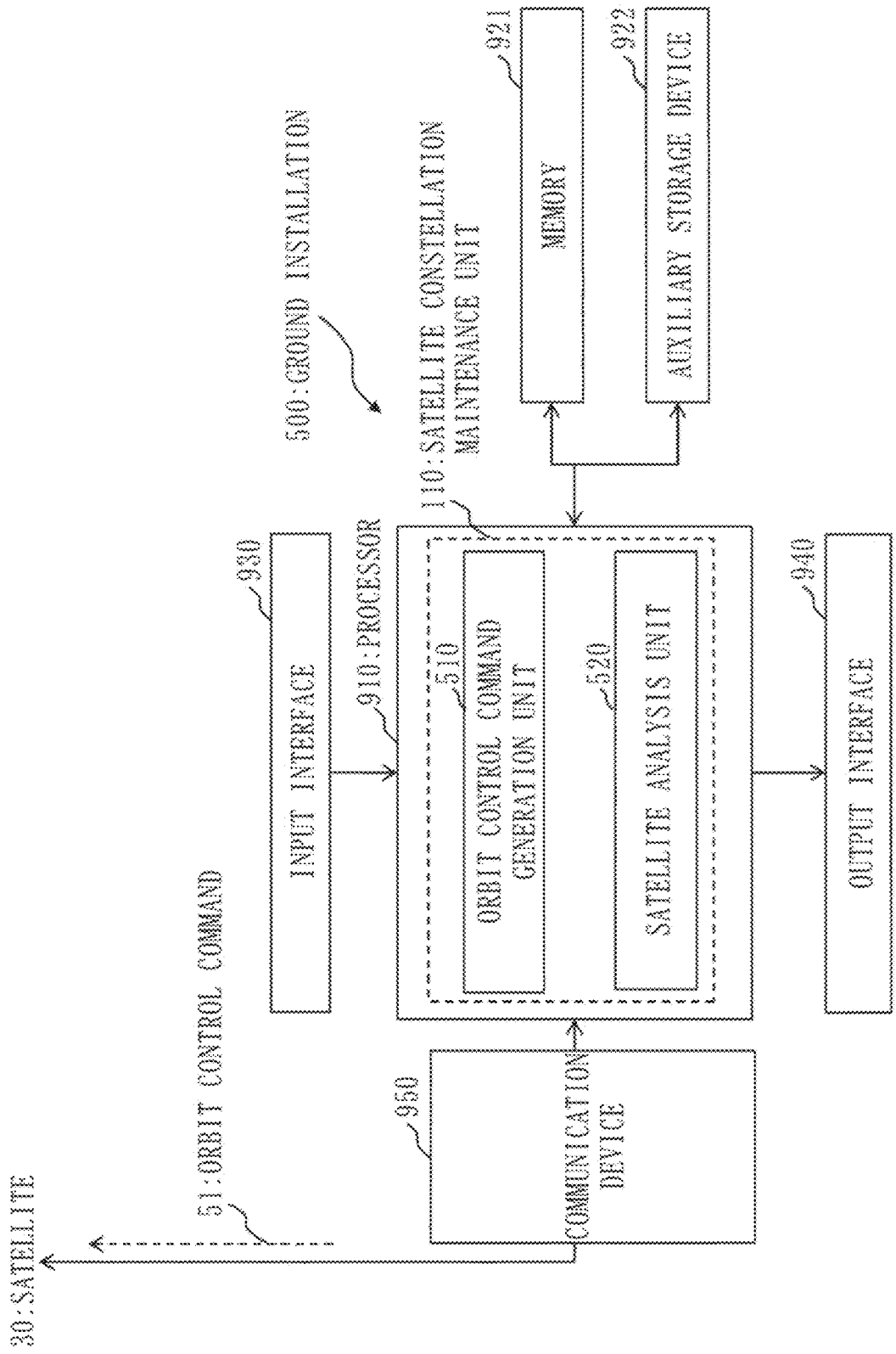
FIG. 4 is a diagram illustrating a configuration example of a ground installation 500 according to Embodiment 1.

FIG. 4 illustrates a configuration example of the ground installation 500 according to the present embodiment.

The ground installation 500 exerts program control over a large number of satellites 30 on all orbit planes. The ground installation 500 is an example of a ground device. The ground device includes a ground station such as a ground antenna device, a communication device connected to the ground antenna device, or an electronic computer and a ground installation as a server or a terminal connected to the ground station by a network. Further, the ground device may include a communication device mounted in a mobile object such as an aircraft, a self-propelled vehicle, or a mobile terminal.

The ground installation 500 forms the satellite constellation 20 by communicating with the satellites 30. The ground installation 500 is included in the satellite constellation maintenance system 100. The ground installation 500 includes the processor 910 and further includes other hardware such as the memory 921, the auxiliary storage device 922, the input interface 930, the output interface 940, and the communication device 950. The processor 910 is connected to other hardware through signal lines in order to control other hardware. The hardware of the ground installation 500 is equivalent to that described in the satellite constellation maintenance system 100 illustrated in FIG. 2. In FIG. 2 and FIG. 4, the hardware included in the ground installation 500 has been described. Hardware having similar functions, however, may be included in a system, a satellite, a device, or an installation other than the satellites 30 and the ground installation 500.

The ground installation 500 includes an orbit control command generation unit 510 and a satellite analysis unit 520 as functional elements. Functions of the orbit control command generation unit 510 and the satellite analysis unit 520 are fulfilled by hardware, software, or a combination of those.

The communication device 950 transmits and receives signals to track and control the satellites 30 of the satellite clusters that configure the satellite constellation 20. Further, the communication device 950 transmits an orbit control command 51 to each satellite 30.

The satellite analysis unit 520 analyzes a state of the satellite constellation 20, states of the satellites 30, and the like. As a specific example, the satellite analysis unit 520 determines whether any satellite 30 configuring the steadily operated satellite cluster 21 has been lost or not and determines whether the satellites 30 configuring the steadily operated satellite cluster 21 are normal or not.

The orbit control command generation unit 510 generates the orbit control command 51 to be transmitted to the satellite 30. Specifically, the orbit control command generation unit 510 transmits commands to implement following operation examples to the satellites 30. Incidentally, a method by which the orbit control command generation unit 510 transmits the commands corresponds to a command transmission method. A program that causes the orbit control command generation unit 510 to transmit the commands corresponds to a command transmission program. The command transmission program may be a portion of the satellite constellation maintenance program.

Thus, the orbit control command generation unit 510 and the satellite analysis unit 520 fulfill the functions of the satellite constellation maintenance unit 110. That is, the orbit control command generation unit 510 and the satellite analysis unit 520 correspond to specific examples of the functions of the satellite constellation maintenance unit 110.

Figure 5:
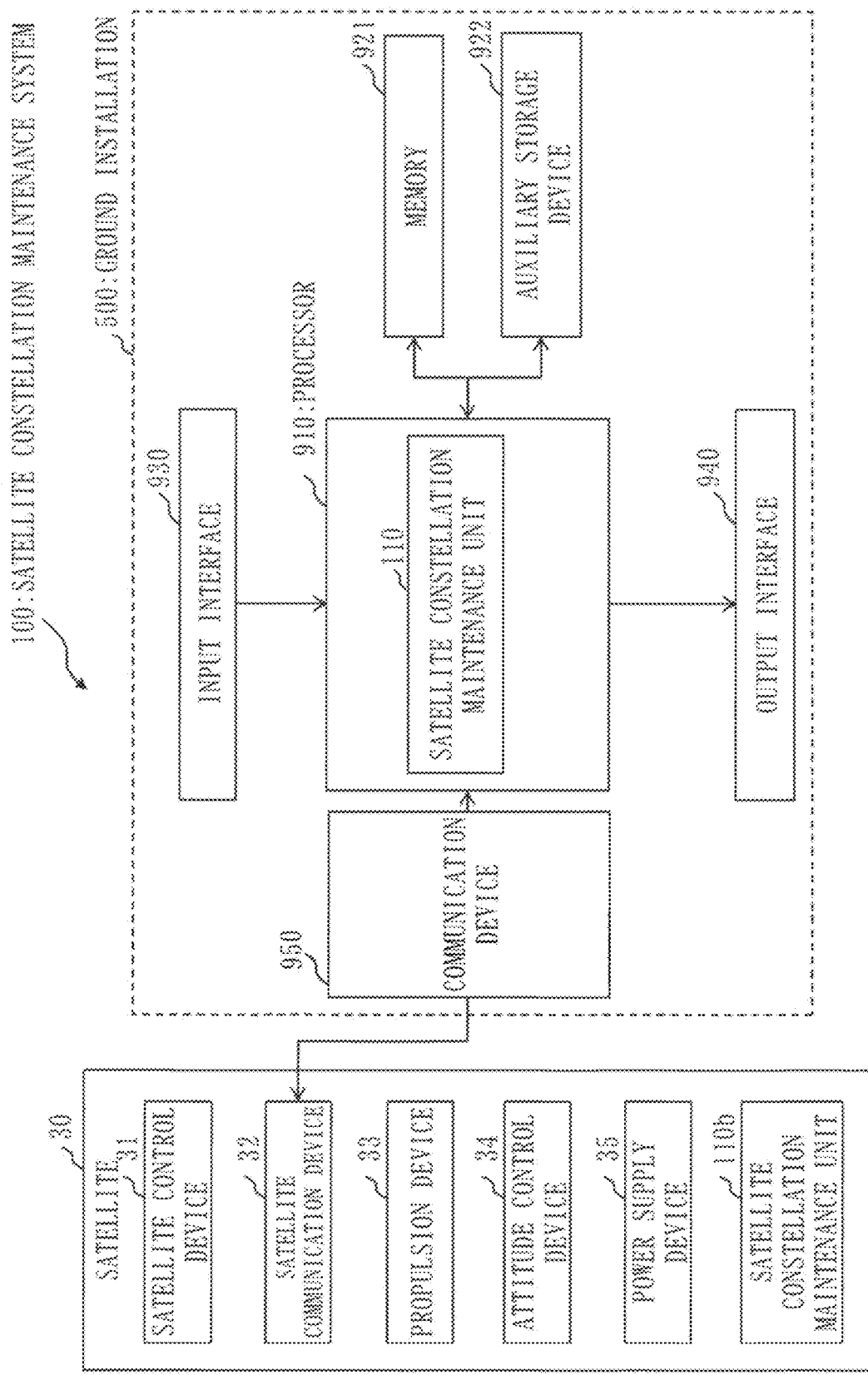
FIG. 5 is a diagram illustrating a configuration example of the satellite constellation maintenance system 100 according to Embodiment 1.

FIG. 5 is a diagram illustrating a functional configuration example of the satellite constellation maintenance system 100 according to the present embodiment.

The satellite 30 further includes a satellite constellation maintenance unit 110b to form the satellite constellation 20. Therein, the satellite constellation maintenance units 110b of the satellites 30 of a plurality of satellites and the satellite constellation maintenance unit 110 included in each ground installation 500 cooperate to fulfill the functions of the satellite constellation maintenance system 100 according to the present embodiment. Incidentally, the satellite constellation maintenance unit 110b of the satellite 30 may be included in the satellite control device 31.

*Description of Operation*

Operation Example 1 According to Embodiment 1

The present operation example corresponds to the satellite constellation maintenance method. Specifically, in a case where a satellite 30 configuring the steadily operated satellite cluster 21 has been lost in the present operation example, a satellite 30, existing around a lost orbital position that is an orbital position where the satellite 30 has been lost in the steadily operated satellite cluster 21, among the satellites 30 configuring the reserve satellite cluster 22 is injected into the lost orbital position in an orbit.

Incidentally, in the satellite constellation maintenance method, a large number of satellites 30 are launched in a lump and orbit planes of the launched satellites 30 are thereafter varied with time, with focus of attention on a fact that no harm is caused even if varying of orbits of reserve satellites standing by on the orbits takes much time.

Further, in the satellite constellation maintenance method, the orbit altitude of the reserve satellite cluster 22 is made different from the orbit altitude of the steadily operated satellite cluster 21 because a demerit of increase in a risk of collision between the satellites 30 configuring the steadily operated satellite cluster 21 and the satellites 30 configuring the reserve satellite cluster 22 occurs if the orbit altitude of the reserve satellite cluster 22 is made the same as the orbit altitude of the steadily operated satellite cluster 21. Incidentally, orbit planes having different orbit altitudes relatively differ in rotational speed in a longitude direction, whereas it is sufficient if the follow-on satellite is selected from orbit planes passing through vicinities of a site where a satellite 30 has been lost in the steadily operated satellite cluster 21 among a plurality of orbit planes of the reserve satellite cluster 22 that are adequately varied.

Herein, a method of forming the reserve satellite cluster 22 will be described. Initially, a launch satellite cluster including a plurality of satellites 30 is launched into outer space to the altitude lower than the orbit altitude of the steadily operated satellite cluster 21.

Subsequently, the satellites 30 configuring the launch satellite cluster vary the orbits of the satellites 30 configuring the launch satellite cluster with use of the propulsion devices 33 provided for the satellites 30 configuring the launch satellite cluster.

After the orbits of the satellites 30 configuring the launch satellite cluster are varied, subsequently, the satellites 30 configuring the launch satellite cluster form at least a portion of the reserve satellite cluster 22 by uniforming orbit altitudes of the satellites 30 configuring the launch satellite cluster with use of the propulsion devices 33 provided for the satellites 30 configuring the launch satellite cluster.

Relative angles of orbit planes of the satellites 30 configuring the reserve satellite cluster 22 can be varied with time with utilization of difference in period of revolution among orbit planes having different normal vectors resulting from difference in orbit altitude.

With change in the orbit altitudes of the satellites 30 with operation of the propulsion devices 33 of the satellites 30 such that the orbit altitudes of all the satellites 30 configuring the reserve satellite cluster 22 are uniformed after the plurality of orbit planes having different normal vectors are evenly varied with respect to the longitude direction, the periods of revolution of the orbit planes of the satellites 30 are uniformed because the orbit altitudes of the satellites 30 are uniform. Accordingly, the reserve satellite cluster 22 flies while the plurality of orbit planes are synchronized so as to have relative angles of the normal vectors maintained. Therefore, the satellites 30 configuring the reserve satellite cluster 22 are allowed to stand by as reserve satellites on the orbits unless the satellites 30 configuring the reserve satellite cluster 22 perform service operation.

Herein, a difference in period of revolution of the orbit plane is caused between the steadily operated satellite cluster 21 and the reserve satellite cluster 22 because there is a difference in orbit altitude between the steadily operated satellite cluster 21 and the reserve satellite cluster 22. If the number of the satellites 30 configuring the reserve satellite cluster 22 is sufficiently large, however, an orbit plane having a comparatively small relative angle of the normal vector with respect to the orbit plane of the lost satellite, that is, an orbit plane positioned in a vicinity of the orbit plane of the lost satellite exists among the orbit planes of the satellites 30 configuring the reserve satellite cluster 22. Herein, the lost satellite refers to a satellite 30 that has been lost among the satellites 30 that are to configure the steadily operated satellite cluster 21. The lost satellite occurs due to a failure, life fulfillment, or the like of a satellite 30.

Therefore, in a case where a lost satellite occurs in the steadily operated satellite cluster 21, it is sufficient if the lost satellite is replaced by operation of the propulsion device 33 of a reserve satellite having an orbit plane existing in the vicinity of the lost orbital position, resultant heightening of the orbit altitude of the reserve satellite to the orbit altitude of the steadily operated satellite cluster 21, and orbit injection of the reserve satellite.

As for phase arrangement in the orbit plane for the orbit injection of the reserve satellite in the orbit plane, the reserve satellite may be injected into a position where the lost satellite existed originally or the reserve satellite may be injected into a position that facilitates the orbit injection after adjustment of relative positions of the satellites 30 existing on the orbit plane of the lost satellite, unless continuation of services of the steadily operated satellite cluster 21 is influenced.

Figure 6:
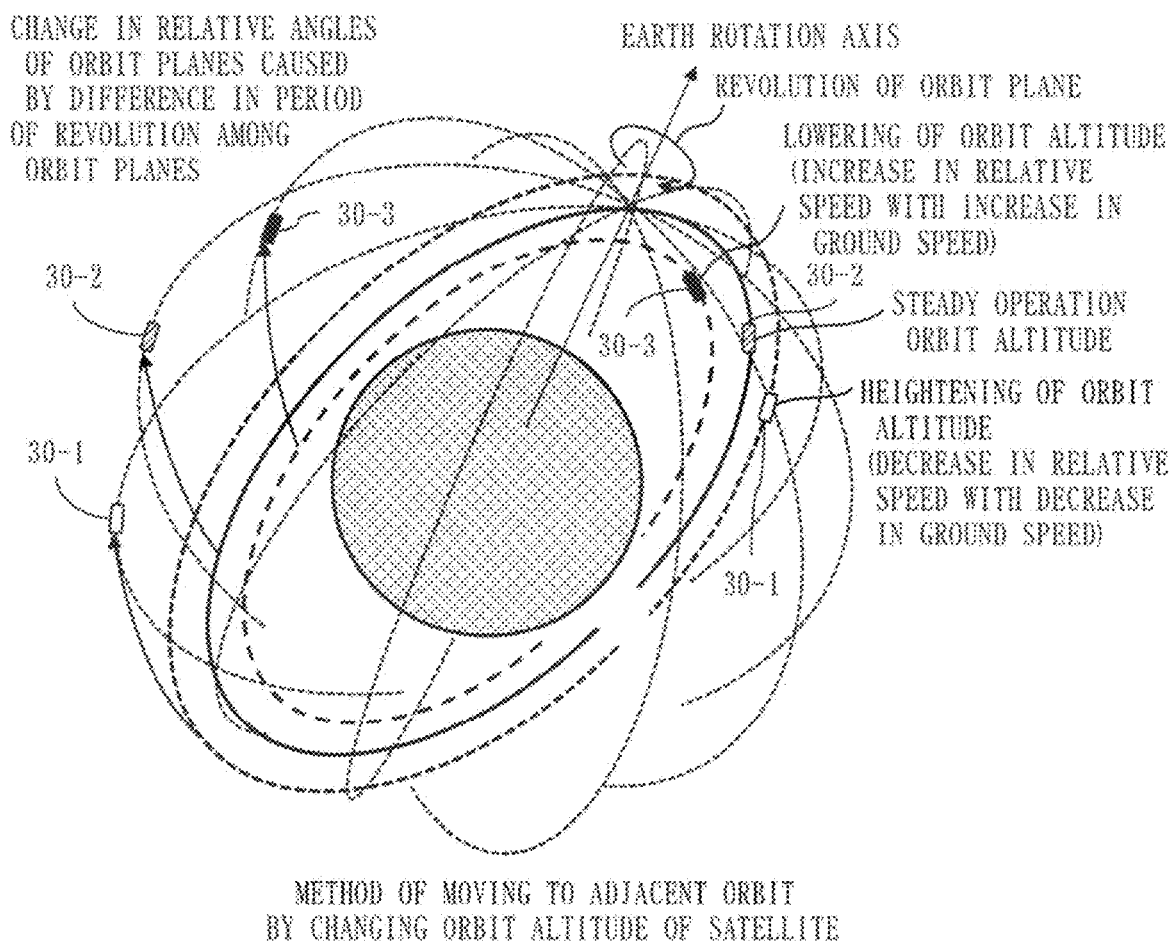
FIG. 6 is a diagram for description of a method of varying relative angles of orbit planes of satellites 30.

FIG. 6 illustrates a method of changing the orbit altitude of the satellites 30 configuring the reserve satellite cluster 22 and thereby varying the relative angles of orbit planes of the satellites 30 orbiting the earth.

Initially, a right side of the drawing will be described. A satellite 30-1, a satellite 30-2, and a satellite 30-3 initially orbit in the same orbit. The satellite 30-1 heightens an orbit altitude thereof at some point in time. As a result, a ground speed of the satellite 30-1 decreases and a relative speed of the satellite 30-1 with respect to the satellite 30-2 decreases.

Herein, the satellite 30-2 does not change an orbit thereof. Further, the satellite 30-3 lowers an orbit altitude thereof at some point in time. As a result, a ground speed of the satellite 30-3 increases and a relative speed of the satellite 30-3 with respect to the satellite 30-2 increases.

On a left side of the drawing, a situation is illustrated in which the relative angles of the orbit planes of the satellites 30 are varied because of the difference in the period of revolution among the orbit planes of the satellites 30. The difference in the orbit altitude among the satellites 30 causes the difference in the period of revolution among the orbit planes of the satellites 30 and thus the relative angles of the orbit planes of the satellites 30 are varied.

According to the satellite constellation maintenance method of the present operation example, a large number of satellites 30 as candidates for follow-on satellites can be launched in a lump, so that it is unnecessary to individually launch a follow-on satellite in order to recover a loss of a satellite 30 which occurs at a random position on a random orbit plane after completion of the initial preparation of a megaconstellation satellite cluster. Thus, an effect is produced in that maintenance costs for the steadily operated satellite cluster 21 can be comparatively lowered.

Further, an effect is produced in that a follow-on satellite can be promptly injected into an orbit of a lost satellite after occurrence of the lost satellite because candidates for the follow-on satellite are standing by in advance in vicinities of the steadily operated satellite cluster 21 instead of a launch of the follow-on satellite after the occurrence of the lost satellite.

Operation Example 2 According to Embodiment 1

The present operation example corresponds to the satellite constellation maintenance method. In the present operation example, specifically, satellites 30 configuring a separating satellite cluster including the plurality of satellites 30 are initially separated at different orbit altitudes from a rocket in outer space. Herein, the rocket appropriately changes an orientation thereof so as to facilitate separation of the satellites 30 configuring the separating satellite cluster.

Subsequently, the satellites 30 configuring the separating satellite cluster move to positions where normal vectors of orbit planes have desired relative angles, due to the difference in the period of revolution resulting from the difference in the orbit altitude among the satellites 30 configuring the separating satellite cluster, and thereafter form at least a portion of the reserve satellite cluster 22 by moving to specified orbital positions in the reserve satellite cluster 22 with use of the propulsion devices 33 provided for the satellites 30 configuring the separating satellite cluster.

Figure 7:
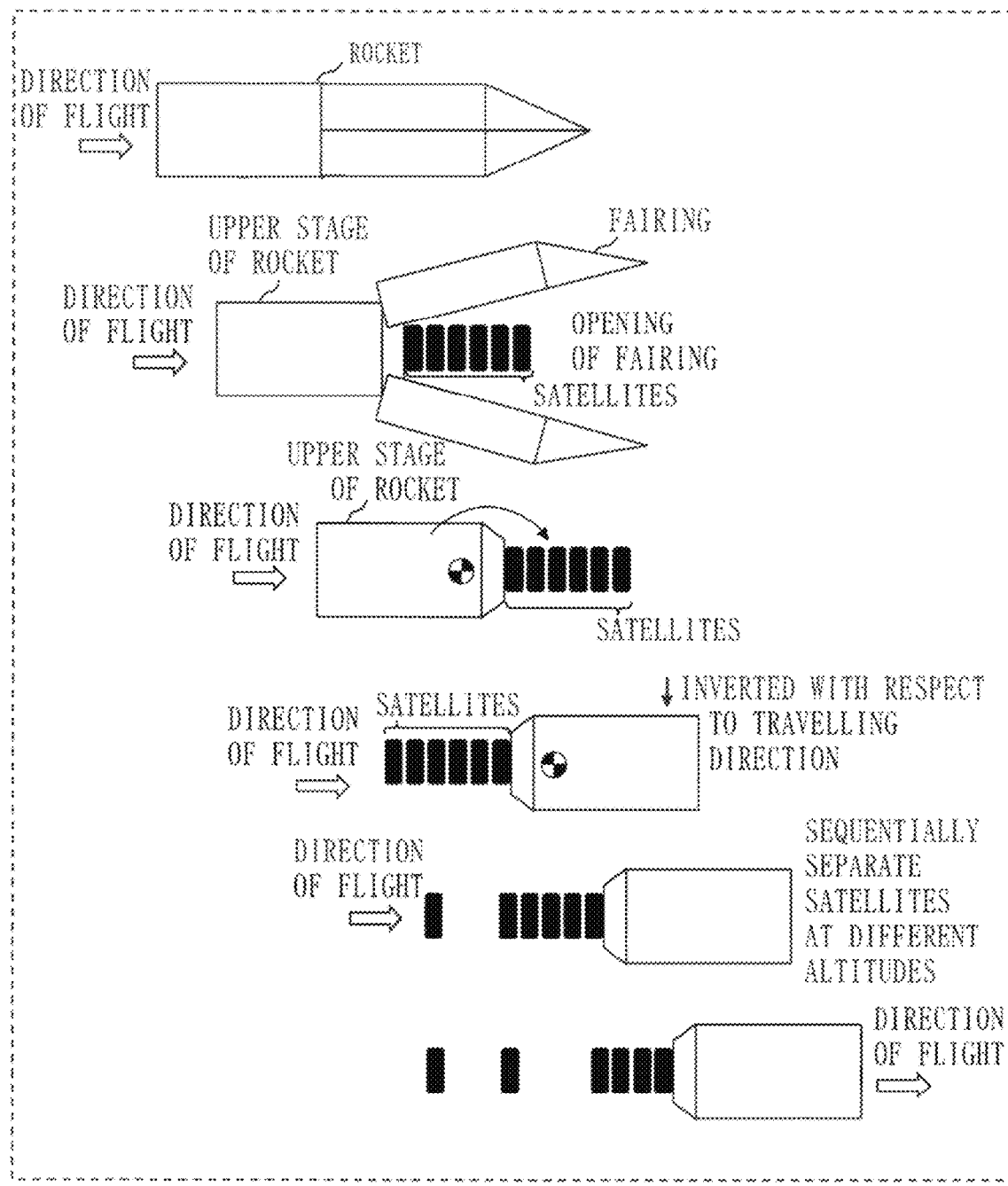
FIG. 7 is a diagram illustrating a situation in which the satellites 30 are separated from a rocket.

FIG. 7 is a diagram for description of the present operation example. The present operation example will be described with use of the drawing.

Initially, the rocket flies with the orientation in which a satellite-carrying portion is positioned on a fore side with respect to a direction of flight for a while after the rocket is launched. Herein, the satellite-carrying portion is covered with fairings when the rocket is launched and a plurality of satellites 30 are mounted as the separating satellite cluster in the satellite-carrying portion.

Subsequently, the rocket opens the fairings at some point in time.

Subsequently, the rocket changes the orientation of the rocket so that the satellite-carrying portion may be positioned on a rear side with respect to the direction of flight.

Subsequently, the rocket separates the satellites 30 mounted in the satellite-carrying portion, one by one. In this operation, the rocket sequentially separates the satellite 30 existing in a lead in a rearward direction with respect to the direction of flight. Further, the rocket may determine whether to separate the satellite 30 or not in consideration of an orbit altitude of the rocket.

Figure 8:
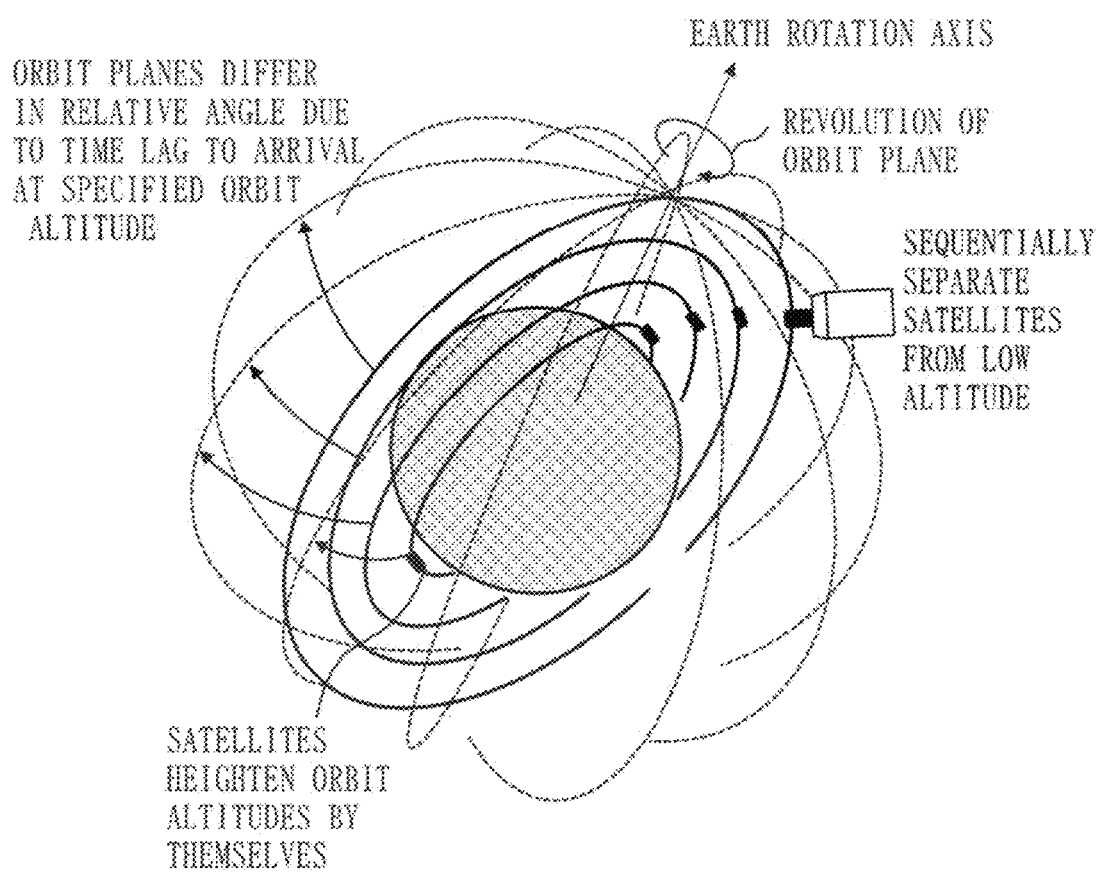
FIG. 8 is a diagram illustrating a situation in which the satellites 30 are separated from a rocket.

FIG. 8 illustrates a situation in which the satellites 30 have been separated from the rocket. The orbit planes of the satellites 30 differ in the period of revolution because the satellites 30 differ in the orbit altitude at points when the satellites 30 are separated from the rocket. Further, the satellites 30 are each heightened to a specified orbit altitude and the relative angle of the orbit plane changes until each satellite 30 reaches the specified orbit altitude. The satellites 30 each adjust the relative angle by appropriately utilizing such a characteristic.

Incidentally, a method by which at least a portion of the satellites 30 configuring the reserve satellite cluster 22 is injected into orbits by the launch of the rocket corresponds to a rocket launching method. The rocket is a large rocket in which a large number of satellites 30 can be mounted, as a specific example. The large number of satellites 30 refer to forty or more satellites 30, as a specific example.

A method by which the large number of satellites 30 are injected as at least a portion of the reserve satellite cluster 22 into orbits at an orbit altitude lower than the orbit altitude of the steadily operated satellite cluster 21 by the launch of the large number of satellites 30 in a lump with the rocket corresponds to the satellite constellation maintenance method.

Incidentally, as for movement between adjoining orbits, movement to a desired orbit is enabled by use of an effect in which change in the orbit altitude for each satellite 30 causes difference in the periods of revolution.

It is rational to launch alternative satellites in a lump into a plurality of lost sites in adjoining orbits, even if orbit planes are lost at random. Further, even if a lost position in an orbit plane is at random, a satellite 30 may be injected into a position that facilitates the orbit injection with phase adjustment in the orbit plane without sticking to order of the satellites 30 in the orbit plane or the satellite 30 may be injected into a desired orbital position.

According to the present operation example that enables the launch of the reserve satellites in a lump, an effect is produced in that launching costs can be drastically reduced compared with individual launches of the reserve satellites.

Further, an effect is produced in that time required for varying of the orbit planes of the reserve satellites can be shortened because varying of the reserve satellites with great differences in the orbit altitude is facilitated.

Operation Example 3 According to Embodiment 1

In the present operation example, an object orbit plane of the steadily operated satellite cluster 21 in the satellite constellation 20 is provided with a plurality of satellites 30.

The present operation example corresponds to the satellite constellation maintenance method. In the present operation example, specifically, in a case of a loss of any of the plurality of satellites 30 provided for the object orbit plane, the loss of the satellite 30 is recovered with phase adjustment of unlost satellites 30 among the plurality of satellites 30 provided for the object orbit plane.

Herein, services that are provided by the satellite constellation 20 will be examined.

On condition that satellites 30 in adjoining orbits independently provide services, the services can be continued even if the number of satellites 30 differs from orbit plane to orbit plane.

On condition that satellites 30 in adjoining orbits make intersatellite communication with one another, a blackout site in communication lines occurs locally. On condition that the satellite constellation 20 can perform complementary service operation with use of a plurality of communication lines by analogy with internet connection, however, the services can be continued even if the number of satellites differs from orbit plane to orbit plane.

Therefore, it may be possible for the satellite constellation 20 to provide services without problems even if the phase adjustment of the satellites 30 is made. Incidentally, it is sufficient if the orbit altitudes of the satellites 30 provided for the object orbit plane are adjusted in order that a sound satellite cluster in the object orbit plane may be relocated with the phase adjustment in the object orbit plane.

Figure 9:
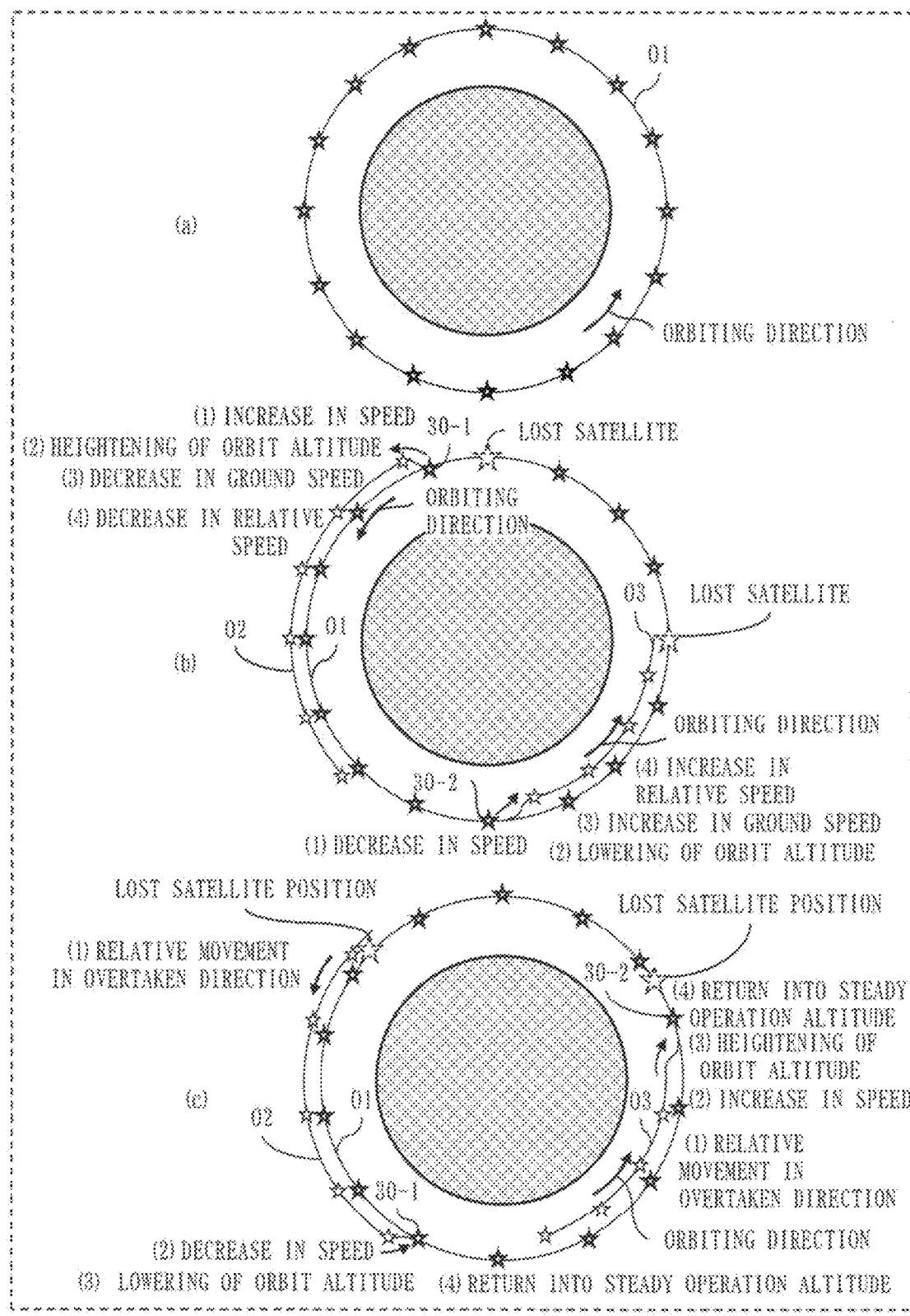
FIG. 9 is a diagram illustrating a situation in which a loss is recovered with phase adjustment for satellites 30.

FIG. 9 is a diagram for description of the present operation example. The operation example will be described with reference to the drawing.

(a) of FIG. 9 illustrates a situation in which none of the plurality of satellites 30 provided for the object orbit plane is lost.

(b) of FIG. 9 illustrates a situation in which satellites 30 provided for the object orbit plane have been lost. In this situation, the satellite 30-1 heightens the orbit altitude of the satellites 30-1 by increasing in speed with use of the propulsion device 33. As a result, the orbit of the satellite 30-1 turns into an orbit O2, a ground speed of the satellite 30-1 decreases, and a relative speed of the satellite 30-1 with respect to the satellites 30 orbiting in an orbit O1 decreases. Incidentally, star signs illustrated in the orbit O2 designate a trajectory of the satellite 30-1. Meanwhile, the satellite 30-2 lowers the orbit altitude of the satellites 30-2 by decreasing in speed with use of the propulsion device 33. As a result, the orbit of the satellite 30-2 turns into an orbit O3, a ground speed of the satellite 30-2 increases, and a relative speed of the satellite 30-2 with respect to the satellites 30 orbiting in the orbit O1 increases. Incidentally, star signs illustrated in the orbit O3 designate a trajectory of the satellite 30-2.

(c) of FIG. 9 illustrates a situation in which the satellite 30-1 and the satellite 30-2 return into the orbit O1. Initially, the satellite 30-1 moves more slowly than the satellites 30 orbiting in the orbit O1 in an orbiting direction, that is, makes relative movement in an overtaken direction with respect to the orbit O1. Subsequently, when positional relation between the satellite 30-1 and the satellites 30 orbiting in the orbit O1 becomes relation that makes it possible for the satellite 30-1 to sufficiently narrow an interval made by the lost satellite, the satellite 30-1 decreases in speed to lower the orbit altitude and returns into the orbit O1. Meanwhile, the satellite 30-2 initially moves faster than the satellites 30 orbiting in the orbit O1 in the orbiting direction, that is, makes relative movement in an overtaking direction with respect to the orbit O1. Subsequently, when positional relation between the satellite 30-2 and the satellites 30 orbiting in the orbit O1 becomes relation that makes it possible for the satellite 30-2 to sufficiently narrow an interval made by the lost satellite, the satellite 30-2 increases in speed to heighten the orbit altitude and returns into the orbit O1.

Figure 10:
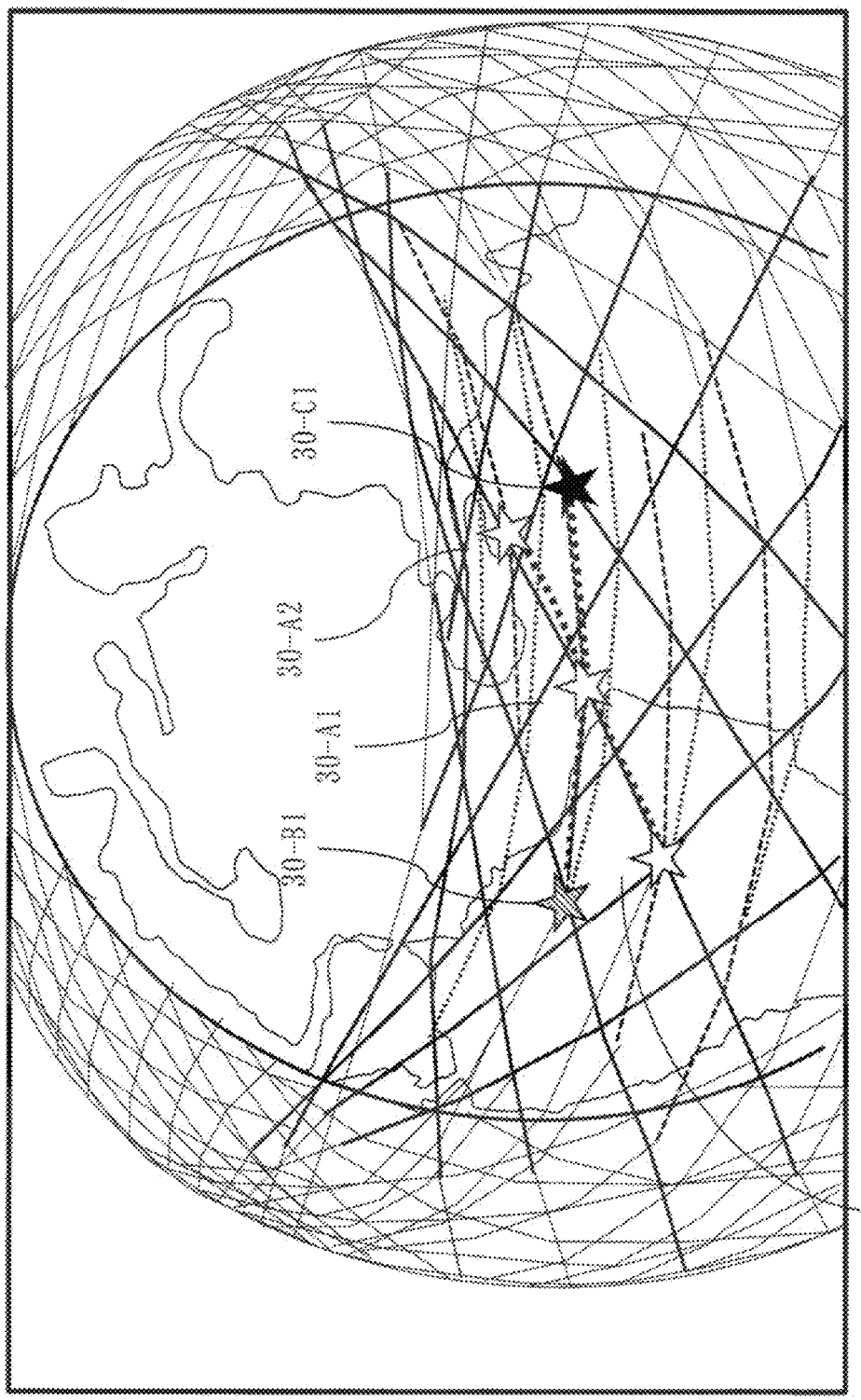
FIG. 10 is a diagram illustrating a specific example of intersatellite communication.
Figure 11:
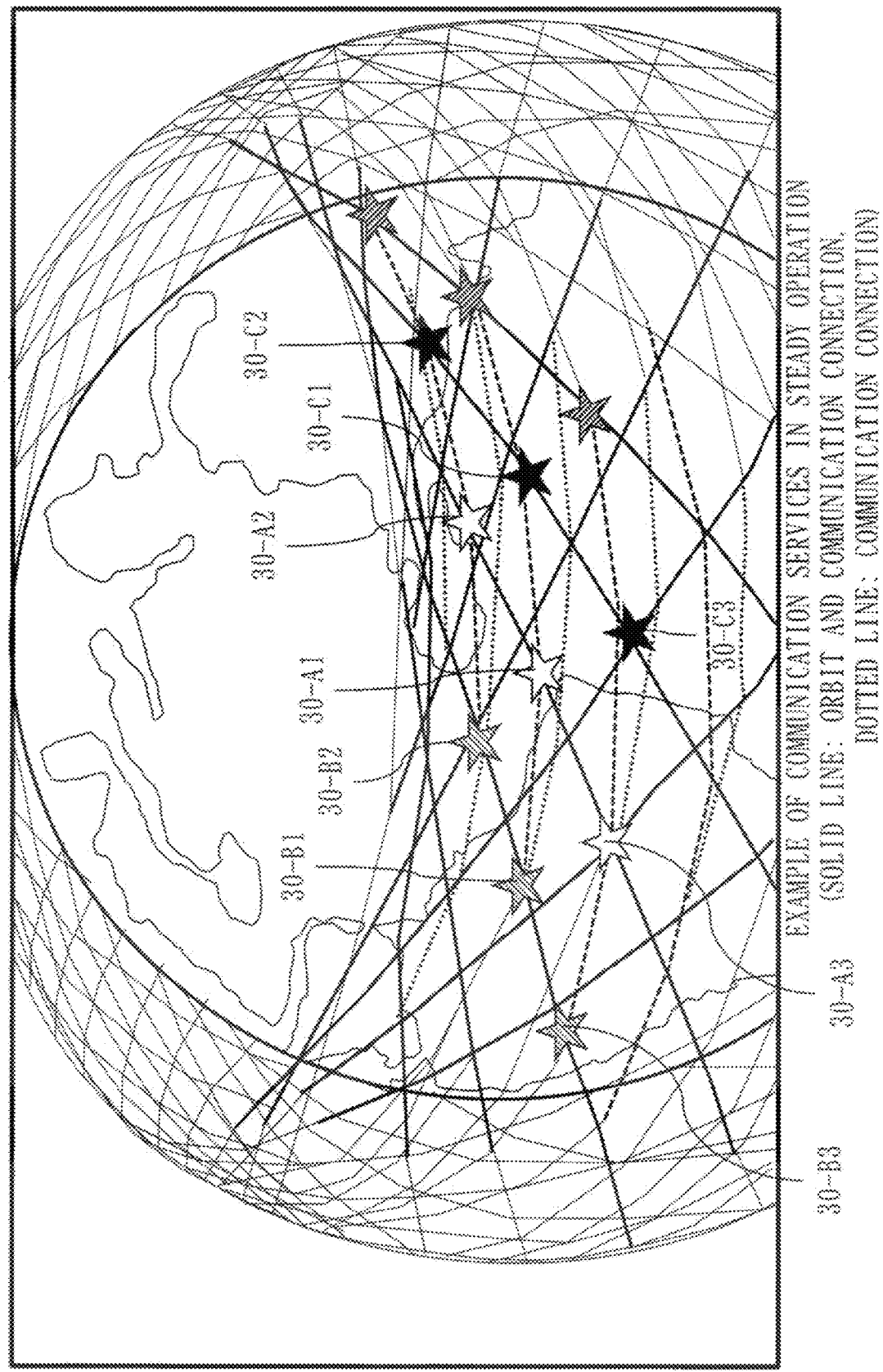
FIG. 11 is a diagram illustrating a specific example of intersatellite communication.
Figure 12:
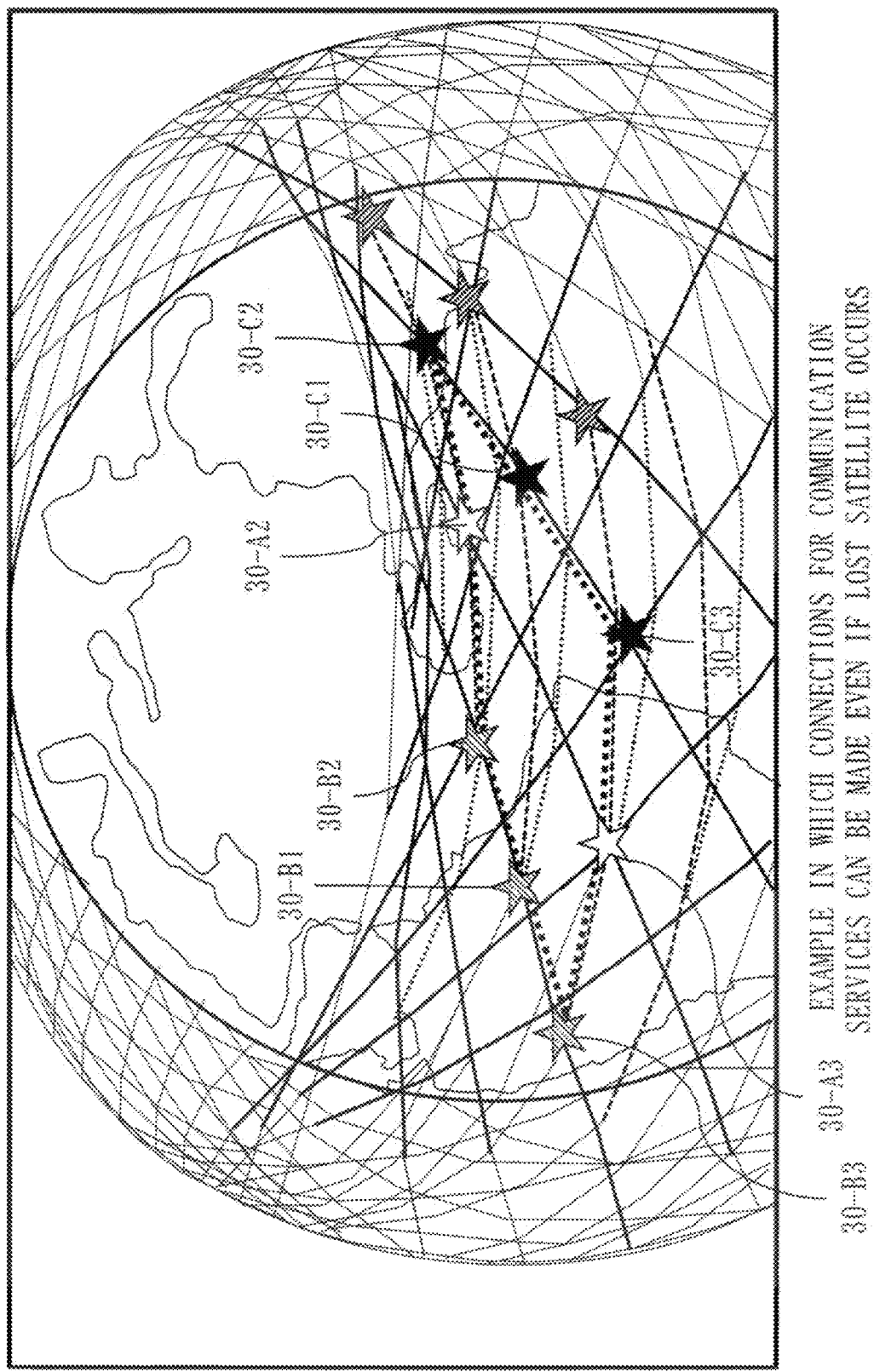
FIG. 12 is a diagram illustrating a specific example of intersatellite communication.

FIG. 10 to FIG. 12 schematically illustrate situations in which the satellites 30 configuring the satellite constellation 20 make intersatellite communication.

FIG. 10 illustrates a situation in which a satellite 30-A1 communicates with surrounding satellites 30. Herein, a satellite 30-A2 and a satellite 30-A3 each orbit in the same orbit as an orbit of the satellite 30-A1 and a satellite 30-B1 and a satellite 30-C1 each orbit in an orbit adjacent to the satellite 30-A1.

FIG. 11 illustrates a specific example of communication services in steady operation. In the drawing, each satellite 30 appropriately communicates with satellites 30 in the same orbit and satellites 30 in adjacent orbits. Herein, solid lines represent orbits and communication connections and dotted lines represent communication connections.

FIG. 12 illustrates a case where the satellite 30-A1 in FIG. 11 has been lost. In this case, each satellite 30 makes intersatellite communication via satellites 30 other than the satellite 30-A1. As a specific example, the intersatellite communication between the satellite 30-A2 and the satellite 30-A3 is made via the satellite 30-B1, a satellite 30-B2, and a satellite 30-B3 or the satellite 30-C1, a satellite 30-C2, and a satellite 30-C3, instead of the satellite 30-A1.

Operation Example 4 According to Embodiment 1

The present operation example corresponds to the satellite constellation maintenance method.

A vacant area for the orbit planes is formed by adjustment of the relative angles in the longitude direction of the orbit planes of the satellites 30 configuring the steadily operated satellite cluster 21 in the satellite constellation 20 and a novel orbit plane is added in the vacant area by orbit injection of a satellite 30 not configuring the steadily operated satellite cluster 21.

In this operation, the vacant area may be ensured by placement of satellites 30, having existed on an orbit plane to be removed, on other orbit planes and a resultant decrease in the number of the orbit planes of the steadily operated satellite cluster 21.

Figure 13:
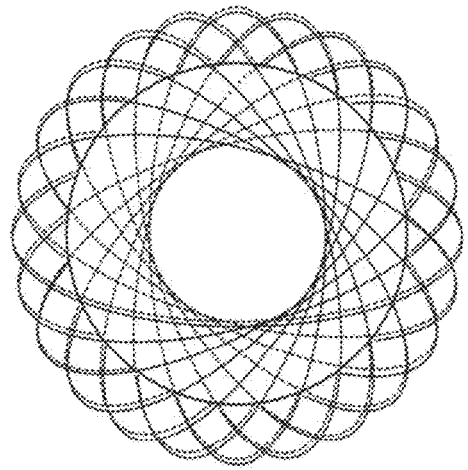
FIG. 13 is a diagram for description of a procedure for forming a vacant area for orbit planes and adding a novel orbit plane.
Figure 13:
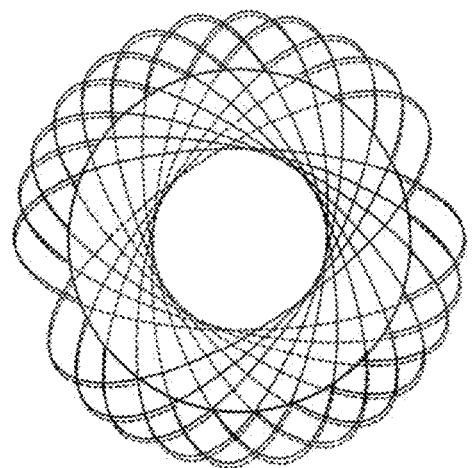
Figure 13:
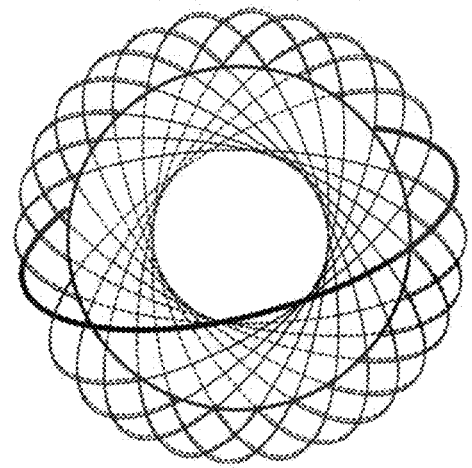

FIG. 13 is a diagram for description of a procedure for forming a vacant area for orbit planes and adding a novel orbit plane. (a) of FIG. 13 illustrates the orbit planes of the steadily operated satellite cluster 21 in which the vacant area has not yet been formed. In a state of (a) of FIG. 13, initially, adjacent orbit planes are sequentially changed in orbit altitude. As a result, the relative angles of the normal vectors of the orbit planes in the longitude direction are gradually changed so as to be as illustrated in (b) of FIG. 13, due to the difference in the period of revolution among the orbit planes resulting from the difference in the orbit altitude. (c) of FIG. 13 illustrates a situation in which the novel orbit plane has been added in the vacant area illustrated in (b) of FIG. 13.

As an application example of the present operation example, decrease in the number of the orbit planes with relocation of sound satellites 30 in an on-orbit satellite cluster and subsequent addition of a novel orbit plane by a launch of satellites 30 in a lump with a rocket in case of increase in losses of satellites 30 resulting from a failure, life fulfillment, or the like in the satellite constellation 20 can be cited. Therefore, the present operation example produces an effect in that the number of the orbit planes and the number of the satellites 30 in the satellite constellation 20 can be maintained. Further, the present operation example produces an effect in that costs for rocket launching can be comparatively lowered because all the satellites 30 on the novel orbit plane can be launched in a lump.

Operation Example 5 According to Embodiment 1

The present operation example corresponds to the satellite constellation maintenance method.

In the operation examples 1 to 4 according to the present embodiment, further, a satellite 30 that does not perform a satellite function among the satellites 30 configuring the steadily operated satellite cluster 21 is deorbited from the orbit of the satellite 30 that does not perform the satellite function. The satellite 30 that does not perform the satellite function refers to a satellite 30 that does not perform a function such as communication service that is to be performed, due to a failure or the like.

Operation Example 6 According to Embodiment 1

The present operation example corresponds to the satellite constellation maintenance method.

On condition that the number of satellites 30 flying at the same orbit altitude differs from orbit plane to orbit plane among a plurality of orbit planes having different normal vectors, it is difficult to avoid collision between satellites 30 on different orbit planes by control over passage timing at nodes among the orbit planes. Therefore, a problem is caused in that a risk of collision between the satellites 30 heightens.

Accordingly, as for the orbits of the satellites 30 configuring the satellite constellation 20 in the present operation example, further, the orbit planes having different normal vectors are made to have different orbit altitudes in the operation examples 1 to 5 of the present embodiment. The present operation example may be applied only to the satellites 30 configuring the steadily operated satellite cluster 21 or may be applied only to the satellites 30 configuring the reserve satellite cluster 22.

According to the present operation example, an effect is produced in that the risk of collision between the satellites 30 having different orbit planes is eliminated because the nodes among the different orbit planes are eliminated by change in the orbit altitude from orbit plane to orbit plane.

Operation Example 7 According to Embodiment 1

The present operation example corresponds to the command transmission method. A command in the present operation example is a type of the orbit control command 51.

In a case where a dysfunctional satellite that is a satellite which does not perform the satellite function exists in the satellites 30 configuring the steadily operated satellite cluster 21 of the satellite constellation 20 employing the satellite constellation maintenance method described in any of the operation examples 1 to 6 according to Embodiment 1, the ground installation 500 transmits a command to deorbit the dysfunctional satellite to the steadily operated satellite cluster 21. The dysfunctional satellite is a satellite 30 that has been made dysfunctional by a failure or the like.

Further, in a case where a dysfunctional satellite exists in the satellites 30 configuring the satellite constellation 20, the ground installation 500 transmits a command to inject a satellite 30 to replace the dysfunctional satellite into an orbit to the reserve satellite cluster 22.

*Other Configurations*
<Modification 1>

Figure 14:
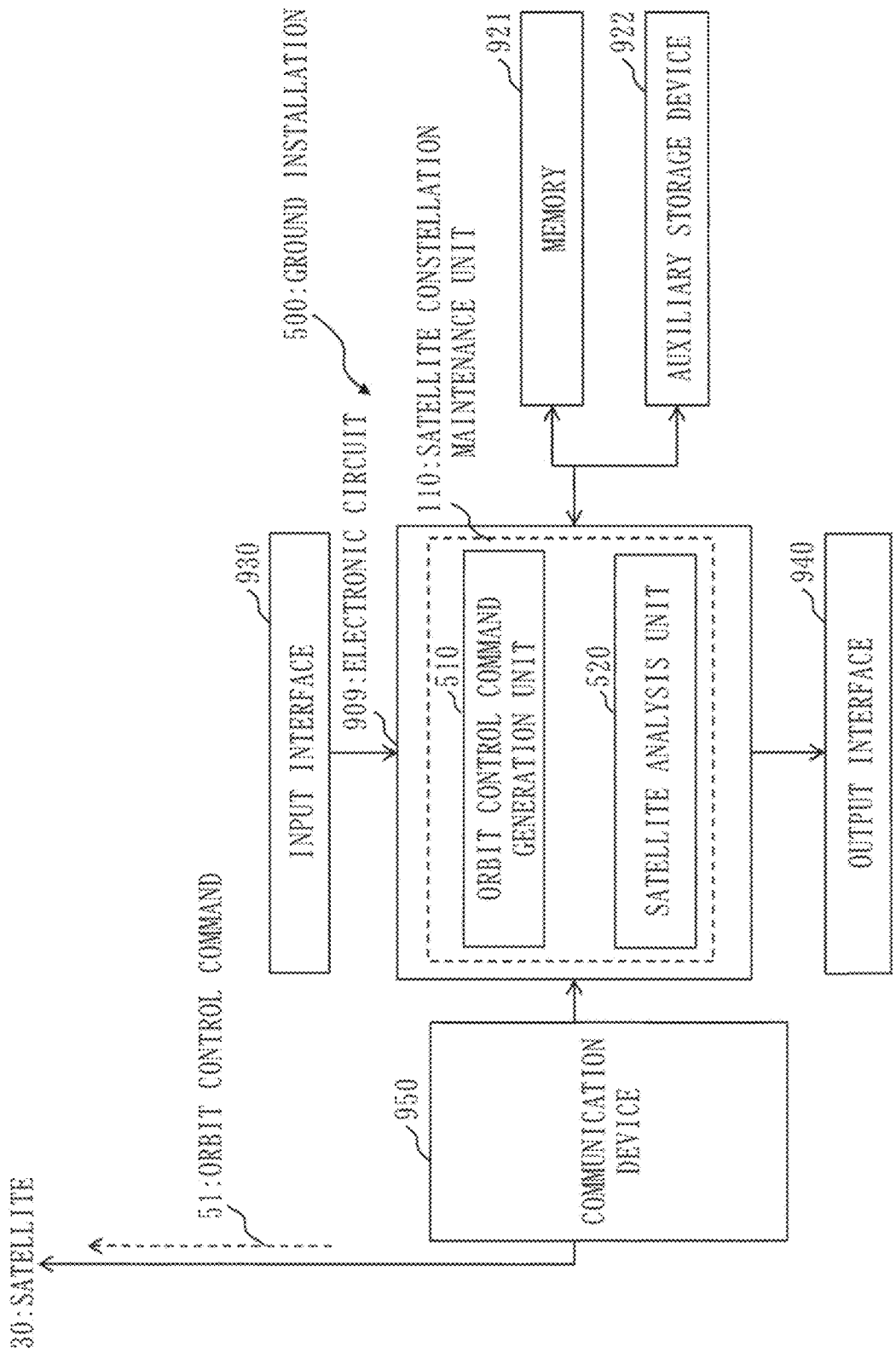
FIG. 14 is a diagram illustrating a configuration example of the ground installation 500 according to a modification of Embodiment 1.

In the present embodiment, the functions of the satellite constellation maintenance unit 110 are fulfilled by software. In a modification, the functions of the satellite constellation maintenance unit 110 may be fulfilled by hardware. FIG. 14 illustrates the present modification.

The ground installation 500 includes an electronic circuit 909 in place of the processor 910.

The electronic circuit 909 is a dedicated electronic circuit to fulfill the functions of the satellite constellation maintenance unit 110.

Specifically, the electronic circuit 909 is a single circuit, a composite circuit, a programmed processor, a parallelly programmed processor, a logic IC, a GA (Gate Array), an ASIC, or an FPGA.

The functions of the satellite constellation maintenance unit 110 may be fulfilled by one electronic circuit or may be fulfilled by being distributed among a plurality of electronic circuits.

In another modification, some of the functions of the satellite constellation maintenance unit 110 may be fulfilled by the electronic circuit 909 and the remaining functions may be fulfilled by software.

The processor 910, the electronic circuit 909, the memory 921, and the auxiliary storage device 922 may be collectively referred to as processing circuitry. That is, the functions of the satellite constellation maintenance unit 110 are fulfilled by the processing circuitry in the satellite constellation maintenance system 100.

OTHER EMBODIMENTS

Though Embodiment 1 has been described, a plurality of portions of the present embodiment may be embodied in combination. Alternatively, the present embodiment may be partially embodied. Otherwise, the present embodiment may be modified in various manners as appropriate and may be generally or partially embodied in any combination.

Incidentally, the embodiment described above intrinsically adduces a preferred example and is not intended for limiting the present disclosure, applications thereof, and the scopes of uses thereof. Described procedures may be modified appropriately.

REFERENCE SIGNS LIST

20: satellite constellation; 21: steadily operated satellite cluster; 22: reserve satellite cluster; 30: satellite; 31: satellite control device; 32: satellite communication device; 33: propulsion device; 34: attitude control device; 35: power supply device; 51: orbit control command; 100: satellite constellation maintenance system; 110, 110b: satellite constellation maintenance unit; 500: ground installation; 501: satellite control device; 510: orbit control command generation unit; 520: satellite analysis unit; 909: electronic circuit; 910: processor; 921: memory; 922: auxiliary storage device; 930: input interface; 940: output interface; 950: communication device; O1, O2, O3: orbit.

The invention claimed is:

1. A method intended for use with a satellite constellation including one hundred or more satellites, the method comprising:
   causing a reserve satellite cluster including a plurality of satellites to stand by at an orbit altitude lower than an orbit altitude of a steadily operated satellite cluster in the satellite constellation, and
   injecting a satellite, existing around a lost orbital position that is an orbital position where a satellite configuring the steadily operated satellite cluster has been lost in the steadily operated satellite cluster, from among the satellites configuring the reserve satellite cluster into the lost orbital position,
wherein the method further comprises:
   launching a launch satellite cluster including a plurality of satellites to an altitude lower than the orbit altitude of the steadily operated satellite cluster,
   after launching the launch satellite cluster, varying orbits of the satellites configuring the launch satellite cluster with use of propulsion devices provided for the satellites configuring the launch satellite cluster including heightening an orbit altitude of one of the satellites configuring the launch satellite cluster and lowering an orbit altitude of another of the satellites configuring the launch satellite cluster, and
   after the orbits of the satellites configuring the launch satellite cluster are varied including the heightening and the lowering, causing the satellites configuring the launch satellite cluster to form at least a portion of the reserve satellite cluster by causing the orbit altitudes of the satellites configuring the launch satellite cluster to be uniform with use of the propulsion devices provided for the satellites configuring the launch satellite cluster.

2. The method according to claim 1, further comprising:
separating satellites configuring a separating satellite cluster including a plurality of satellites at different orbit altitudes from a rocket in outer space,
moving the satellites configuring the separating satellite cluster to positions where normal vectors of orbit planes have desired relative angles due to a difference in period of revolution resulting from a difference in orbit altitudes among the satellites configuring the separating satellite cluster, and thereafter
forming at least a portion of the reserve satellite cluster by moving the satellites configuring the separating satellite cluster to specified orbital positions in the reserve satellite cluster with use of propulsion devices provided for the satellites configuring the separating satellite cluster.

3. The method according to claim 1, further comprising:
providing an object orbit plane of the steadily operated satellite cluster in the satellite constellation with a plurality of satellites, and
recovering a loss of any of the satellites provided for the object orbit plane with phase adjustment of unlost satellites among the satellites provided for the object orbit plane.

4. The method according to claim 1, further comprising:
forming a vacant area for orbit planes by adjustment of relative angles in a longitude direction of orbit planes of a plurality of satellites configuring the steadily operated satellite cluster in the satellite constellation, and
adding a novel orbit plane in the vacant area by orbit injection of a satellite not configuring the steadily operated satellite cluster.

5. The method according to claim 4, further comprising:
placing a satellite, having existed on an orbit plane to be removed, on another orbit plane, and
decreasing a number of orbit planes of the steadily operated satellite cluster.

6. The method according to claim 1, further comprising deorbiting a satellite that does not perform a satellite function among the satellites configuring the steadily operated satellite cluster.

7. The method according to claim 1, further comprising launching a multitude of satellites in a lump with a rocket such that the multitude of satellites are injected as at least a portion of the reserve satellite cluster into orbits at an orbit altitude lower than the orbit altitude of the steadily operated satellite cluster.

8. A satellite constellation employing the method according to claim 1, wherein orbit planes for orbits of the satellites configuring the satellite constellation having different normal vectors are made to have different orbit altitudes.

9. The method according to claim 1, further comprising transmitting, to the steadily operated satellite cluster, a command to deorbit a dysfunctional satellite that is a satellite that does not perform a satellite function and that exists in the satellites configuring the steadily operated satellite cluster of the satellite constellation.

10. A processing circuitry intended for use with a satellite constellation including one hundred or more satellites, the processing circuitry configured to:
cause a reserve satellite cluster including a plurality of satellites to stand by at an orbit altitude lower than an orbit altitude of a steadily operated satellite cluster in the satellite constellation, and
inject a satellite, existing around a lost orbital position that is an orbital position where a satellite configuring the steadily operated satellite cluster has been lost in the steadily operated satellite cluster, from among the satellites configuring the reserve satellite cluster into the lost orbital position,
wherein the processing circuitry is further configured to:
launch a launch satellite cluster including a plurality of satellites to an altitude lower than the orbit altitude of the steadily operated satellite cluster,
after launching the launch satellite cluster, vary orbits of the satellites configuring the launch satellite cluster with use of propulsion devices provided for the satellites configuring the launch satellite cluster including heightening an orbit altitude of one of the satellites configuring the launch satellite cluster and lowering an orbit altitude of another of the satellites configuring the launch satellite cluster,
after the orbits of the satellites configuring the launch satellite cluster are varied including the heightening and the lowering, cause the satellites configuring the launch satellite cluster to form at least a portion of the reserve satellite cluster by causing the orbit altitudes of the satellites configuring the launch satellite cluster to be uniform with use of the propulsion devices provided for the satellites configuring the launch satellite cluster, and
transmit, to the steadily operated satellite cluster, a command to deorbit a dysfunctional satellite that is a satellite that does not perform a satellite function and that exists in the satellites configuring the steadily operated satellite cluster of the satellite constellation.

11. The processing circuitry according to claim 10, wherein the processing circuitry is configured to transmit a command to inject a satellite to replace the dysfunctional satellite into an orbit to the reserve satellite cluster.

12. A non-transitory computer readable medium storing a program intended for use with a satellite constellation including one hundred or more satellites which when executed causes a computer to perform a method, the method comprising:
causing a reserve satellite cluster including a plurality of satellites to stand by at an orbit altitude lower than an orbit altitude of a steadily operated satellite cluster in the satellite constellation, and
injecting a satellite, existing around a lost orbital position that is an orbital position where a satellite configuring the steadily operated satellite cluster has been lost in the steadily operated satellite cluster, from among the satellites configuring the reserve satellite cluster into the lost orbital position,
wherein the method further comprises:
launching a launch satellite cluster including a plurality of satellites to an altitude lower than the orbit altitude of the steadily operated satellite cluster,
after launching the launch satellite cluster, varying orbits of the satellites configuring the launch satellite cluster with use of propulsion devices provided for the satellites configuring the launch satellite cluster including heightening an orbit altitude of one of the satellites configuring the launch satellite cluster and lowering an orbit altitude of another of the satellites configuring the launch satellite cluster,
after the orbits of the satellites configuring the launch satellite cluster are varied including the heightening and the lowering, causing the satellites configuring the launch satellite cluster to form at least a portion of the reserve satellite cluster by causing the orbit altitudes of the satellites configuring the launch satellite cluster to be uniform with use of the propulsion devices provided for the satellites configuring the launch satellite cluster, and
transmitting, to the steadily operated satellite cluster, a command to deorbit a dysfunctional satellite that is a satellite that does not perform a satellite function and that exists in the satellites configuring the steadily operated satellite cluster of the satellite constellation.

* * * * *